J. P. CURRY.
AUTOMATIC PACKAGE FILLER AND WEIGHER.
APPLICATION FILED FEB. 11, 1910. RENEWED MAY 16, 1912.
1,048,446.
Patented Dec. 24, 1912.
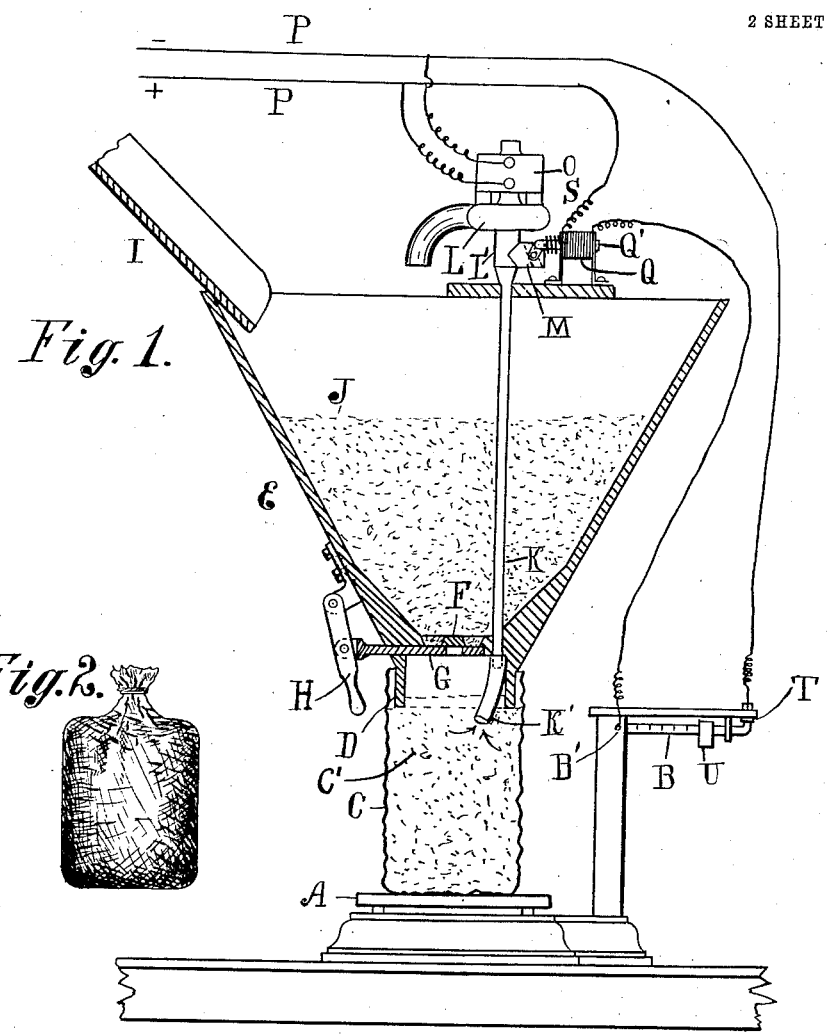
Fig. 1.
Fig. 2.
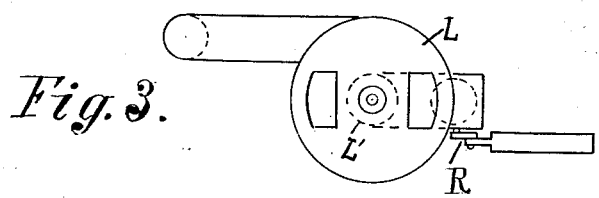
Fig. 3.
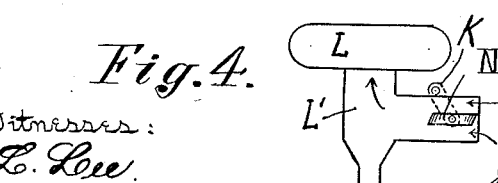
Fig. 4.

J. P. CURRY.
AUTOMATIC PACKAGE FILLER AND WEIGHER.
APPLICATION FILED FEB. 11, 1910. RENEWED MAY 16, 1912.

1,048,446.

Patented Dec. 24, 1912.

2 SHEETS—SHEET 2.

UNITED STATES PATENT OFFICE.

JOHN P. CURRY, OF NEW YORK, N. Y.

AUTOMATIC PACKAGE FILLER AND WEIGHER.

1,048,446.  Specification of Letters Patent.  Patented Dec. 24, 1912.

Application filed February 11, 1910, Serial No. 543,313. Renewed May 16, 1912. Serial No. 697,787.

*To all whom it may concern:*

Be it known that I, JOHN P. CURRY, a citizen of the United States, residing at 62 West Eighty-ninth street, New York, county of New York, and State of New York, have invented certain new and useful Improvements in Automatic Package Fillers and Weighers, fully described and represented in the following specification and the accompanying drawings, forming a part of the same.

This invention relates to an apparatus for filling a package with the exact weight of material desired, the operations of filling and weighing being performed in a continuous process while the package is supported upon a scale.

The invention is devised particularly for filling packages with cement, flour, and other powdered materials. Bags, boxes or barrels can be filled.

In this invention, the apparatus is provided with a scale upon which the package to be filled is placed, a spout sustained above the package with a supply of material for delivering an overcharge of the material to the package while upon the scale, a fixture secured within the spout extending to the material placed in the package, and mechanism for withdrawing the surplus material by means of said fixture until the scale indicates the proper charge. If a large hopper be connected with the spout, the only act required of the operator after placing the package upon the scale is to manipulate a hand valve, to shut off the supply of material to the spout when the package is overcharged, which is readily indicated by the scale; the remainder of the process being entirely automatic, so that in a few moments the package properly charged can be removed from the scale and an empty package replaced. A pneumatic agency or a mechanical conveyer may be employed to remove the surplus material from the package, such agency being in either case secured as a fixture within the spout so that it is not moved or disturbed in any way when applying and removing the packages.

Figure 5:
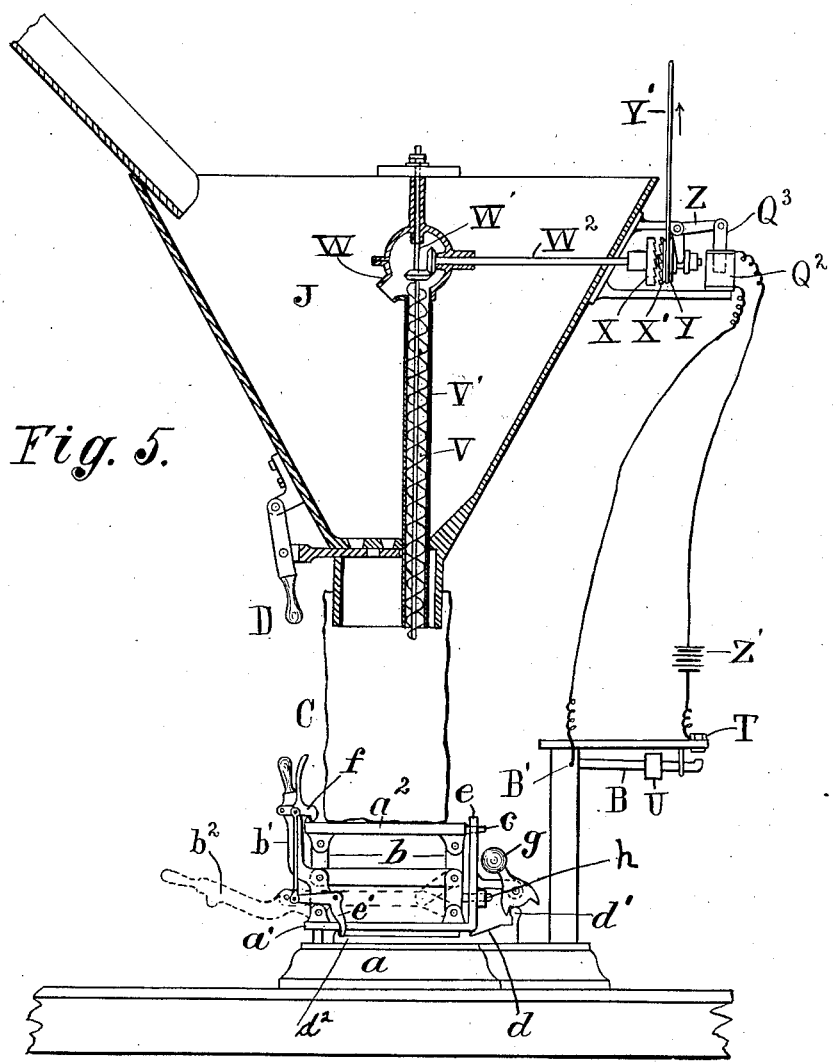
Figure 6:
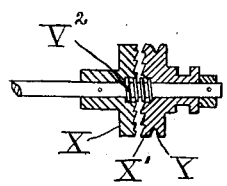

In the drawing, Figure 1 is a diagrammatic representation of a hopper, a scale, and the fixtures required to remove the surplus material by an exhaust-tube; the package and other parts being shown in section at the middle line of the spout, where hatched; Fig. 2 represents a sealed package removed from the scale and tied at the neck; Fig. 3 represents a plan, and Fig. 4 a vertical section of the exhaust-pump upon a larger scale than Fig. 1; Fig. 5 is a diagrammatic representation of an apparatus employing a screw-conveyer to remove the surplus material. Fig. 6 shows the shaft W and a clutch X, X' enlarged with the clutch parts in section at the center line.

In Fig. 1, A represents the scale-platform, B the scale-beam, C a bag or package set upon the platform, D a spout connected with a hopper E, F a valve-plate in the bottom of the hopper, and G a valve-slide provided with a lever-handle H to open and close the same. A chute I is shown for supplying the hopper with the material J. A tube K is shown extended through the valve-plate F inside of the spout D and provided with a flexible nozzle K' which extends a little below the spout so as to certainly penetrate the material C' placed in the package C, the neck or open top of which encircles the spout. The inlet of an exhaust-pump L is shown connected with the tube K by a neck L' having a branch M in which a balanced butterfly-valve N is shown (Figs. 3 and 4). An electric motor O is shown connected with the spindle of the exhaust-pump and connected by circuit wires and conductors P and P' of an electric circuit. The motor and exhaust-pump are intended to run continuously during the operation of the device. A solenoid-magnet Q is shown fixed adjacent to the end of the inlet M and its movable armature Q' pivoted to a crank R upon the pivot of the valve N. A spring S operates to hold the valve N normally closed with the armature withdrawn partly from the solenoid. The circuit wires P, P' are connected with the solenoid and with electric conductors upon the scale, one of the circuit wires connecting with the scale-beam through its pivot B', and the other connected with an insulated block T adjacent the end of the scale-beam, with which it makes a contact to close the circuit through the solenoid when the package is overcharged, and thus exceeds the weight to which the scale is set.

The operation of the device is as follows: The operator places a bag or package upon the scale, the weight U of which is properly adjusted upon the scale-beam B to the desired weight for the package. The weight U holds the scale-beam down until the filling of the package, which is effected by the operator's opening the slide-valve G. When the operator perceives the scale-beam to rise, he closes the valve-slide, leaving an excess of material in the package. At such time, the circuit through the solenoid Q is closed and the valve M is held shut, thus causing the vacuum in the exhaust-pump to operate through the tube K and lever K'. This maintains a constant suction within the spout and lifts the surplus material from the charge in the package until the desired weight is reached, when the scale-beam falls, thus breaking the circuit through the solenoid and permitting the spring S to open the valve N. This supplies the suction of the exhaust-pump liberally with air, the inlet being larger than the tube K, and thus destroys the suction in the nozzle K' and arrests the removal of the material from the package. The scale is so adjusted in vertical relation to the spout that the material lies below the level of the spout when the package is properly charged, and the neck of the bag or the upper edge of the package can be bent down beneath the spout and the filled package removed from the scale.

The operation of adjusting the weight of the material in the package is wholly automatic, as the removal of the surplus material is arrested without any attention on the part of the workman when the weight is duly attained. The same effect is produced by the screw-conveyer or elevator V shown in Fig. 5; the casing V' for which is extended through the tube-plate and upward above the level of the material J in the hopper, so that the surplus material raised may be discharged into the hopper by an overflow-outlet W. The casing V' is extended down to the end of the spout D and the conveyer-screw is extended a little below the bottom of such casing, so as to surely penetrate the material in the package and lift the surplus to the outlet W. The spindle W' of the conveyer is connected by gearing with a shaft W² which extends through the side of the hopper and is provided with a clutch-plate X. The shaft extends through the clutch-plate sufficiently for another clutch-plate X' to be fitted movably on the shaft, and driven thereon by a pulley Y, and a belt or cord from a suitable motor. A spring upon the shaft outside of the pulley operates to hold the clutch-plates normally together, which causes the pulley to rotate the conveyer while an overcharge of weight is upon the scale; but automatic means is provided to stop the conveyer when the weight is properly adjusted. Such means consists of a bell crank-lever Z for shifting the clutch-plate X', coupled to a solenoid armature Q³ which is operated by a solenoid-magnet Q² in circuit with a generator z' and the contacts B' and T for the scale beam B. The textile fabric of which cement or flour bags is made is readily pulled away from beneath the projecting end of the screw-conveyer V, but where the packages are, as in the case of barrels, made of more rigid material, the platform of the scale may be made to drop when removing the same, and the platform again raised when a fresh package is applied. Means for thus dropping the platform is shown in Fig. 5 where the scale has a base $a$, a scale-pan $a'$, and a platform $a^2$, supported upon the scale-pan by toggle-links $b$. One of the links is furnished with a handle $b'$, and the tipping of such handle downward, as indicated by dotted lines $b^2$, bends the links and lowers the platform $a^2$ to remove the loaded package. The platform $a^2$ is guided in its rise and fall by studs $c$ fitted to slots in a vertical guide-plate $e$ attached to one edge of the scale-pan. The removal of the surplus material drops the scale-beam B (as in Fig. 5), and to prevent the pushing of the beam upward while removing the filled package from the scale (which would renew the motion of the conveyer) a wedge $d$ is arranged to be moved beneath the scale-pan before the platform $a^2$ is lowered. This is effected by a bell-crank $e'$ pivoted on the hand-lever $b'$, and a latch $f$ having a tooth to hook upon the edge of the platform $a^2$. The crank and latch are linked together. One ear of the bell-crank engages a lug $d^2$ at one end of the wedge $d$, and the first movement of the latch, before lowering the platform, crowds the wedge between the base $a$ and the scale-pan $a'$, and thus prevents the scale-beam B from closing the circuit to the clutch X'. A counterbalance $g$ is pivoted over the outer end of the wedge, and has two ears to engage a lug $d'$ upon the wedge. When the wedge is pressed beneath the scale-pan by the bell-crank $e'$, the lug $d'$ throws the counterbalance into a position opposite that shown in Fig. 5; which enables it to automatically retract the wedge when the platform is again raised with a fresh package. A sliding-pin $h$ is set in the plate $e$, which is pushed against one of the ears when the links $b$ are raised, as in Fig. 5, thus throwing the counterbalance into the position shown in Fig. 5; which jerks the wedge away from the scale-pan and always leaves the scale free to weigh the charge, when the platform $a^2$ is raised. The engagement of a tooth on the latch $f$ with an upward projection upon the edge of the platform $a^2$ prevents the movement of the lever $b'$ to lower the platform, until the scale-pan is first blocked by the wedge $d$.

The essential feature of the invention is the application of the withdrawing-fixture permanently to the interior of the spout, so that it requires no adjustment to perform its functions, and does not in any case require to be disturbed or moved when applying the bag to or removing it from the spout.

It is to be understood that the device fills the empty package while standing upon the scale, so that the bag does not require to be filled by extraneous means before it is placed upon the scale. This renders the operation of filling and weighing the bag continuous, and enables it to be made automatic as described herein.

Having thus set forth the nature of the invention what is claimed herein is:

1. An apparatus for filling packages with a definite weight of material, consisting of a hopper, means for controlling the discharge from the same to overcharge the package, a scale beneath the spout of the hopper to support the package while filling, a fixture secured within the spout extending to the material placed in the package, and mechanism for withdrawing the surplus material by means of said fixture until the scale indicates the proper charge.

2. An apparatus for filling packages with a definite weight of material, consisiting of a hopper with spout and means for controlling the discharge from the same to overcharge the package, a scale beneath the spout of the hopper to support the package while filling, a fixture secured within the spout extending to the material placed in the package, and an exhaust connection to such fixture for withdrawing the surplus material from the charged package.

3. An apparatus for filling packages with a definite weight of material, consisting of a hopper, a valve controlling the same to overcharge the package, a scale beneath the spout of the hopper to support the package while filling, a tube secured within the spout extending to the material placed in the package and means for withdrawing the surplus material through the said tube and discharging it into the hopper.

4. An apparatus for filling packages with a definite weight of material, consisting of a hopper, a valve-plate at the bottom with valve applied thereto and means for actuating said valve by hand, a scale beneath the spout of the hopper to support the package while filling, a tube extended through the valve-plate and into the material placed in the package and carried above the surface of the material in the hopper, and means operating through the tube for withdrawing such surplus material through the package and discharging it into the hopper.

5. An apparatus for filling packages with a definite weight of material, consisting of a hopper, a valve controlling the same to overcharge the package, a scale beneath the spout of the hopper to support the package while filling, a tube secured within the spout and extended to the material placed in the package, means for withdrawing the surplus material through the said tube, and means actuated by the movement of the scale for controlling such withdrawing means, to arrest its operation when the weight of the package is adjusted.

6. An apparatus for filling packages with a definite weight of material, consisting of a hopper, a valve controlling the same to overcharge the package, a scale beneath the spout of the hopper to support the package while filling, a tube secured within the spout and extended to the material placed in the package, means for withdrawing the surplus material through the said tube, an electro-magnet with an armature operating upon such withdrawing means, an electric circuit connected therewith, and a switch in said circuit actuated by the scale when the weight of the package is adjusted.

7. An apparatus for filling packages with a definite weight of material, consisting of a hopper, a valve controlling the same to overcharge the package, a scale beneath the spout of the hopper to support the package while filling, a tube secured within the spout extending to the material placed in the package and the tube extended above the level of the material in the hopper, an exhaust-pump connected with the tube and the tube having an air-inlet adjacent to the pump, a valve in such air-inlet to check the withdrawal of material when the weight of the package is adjusted.

8. An apparatus for filling packages with a definite weight of material, consisting of a hopper with spout adapted to supply the package, a valve-plate adjacent to the spout and a valve applied thereto with handle for operating the same, a tube extended through the valve-plate and having a flexible nozzle extended into the material in the package and the tube extended above the material in the hopper, an exhaust-pump connected with the tube and having an inlet for supplying the pump independently of the tube, a valve for opening such inlet, a spring for holding the valve normally closed, an electro-magnet for opening the valve, an electric circuit connected with the same, and a switch actuated by the movement of the scale-beam for closing such circuit and opening the valve.

In testimony whereof I have hereunto set my hand in the presence of two subscribing witnesses.

JOHN P. CURRY.

Witnesses:
L. LEE,
THOMAS S. CRANE.